United States Patent Office 3,513,235
Patented May 19, 1970

3,513,235
METHOD OF CONTROLLING ASCITES TUMORS WITH CHLORPHENIRAMINE MALEATE
Teruta Matsunaga, 5, 2-chome, Kosasebo-cho, Nagasaki, Sasebo-shi, Japan
No Drawing. Continuation-in-part of application Ser. No. 686,327, Nov. 28, 1967. This application May 2, 1969, Ser. No. 821,475
Int. Cl. A61k 27/00
U.S. Cl. 424—263                                 1 Claim

ABSTRACT OF THE DISCLOSURE

This invention relates to a method for controlling Ehrlich ascites tumor with chlorpheniramine maleate.

---

This application is a continuation-in-part of copending application Ser. No. 686,327, filed Nov. 28, 1967, which is a continuation-in-part of application Ser. No. 584,093, filed Oct. 4, 1966, both now abandoned.

The present invention relates to a new composition of matter for controlling pathologic development of cells in animal body. It also relates to a method for controlling pathologic development of cells in animal body.

Chlorpheniramine maleate of the formula:

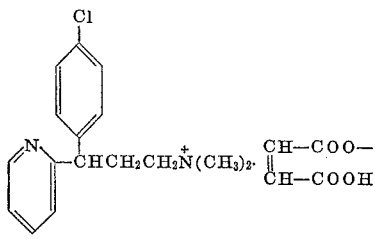

has heretofore been used as an antihistaminic agent for local and generalized allergic reactions [cf. Merck Index, Seventh Edition, p. 249].

The present inventor has unexpectedly found that chlorpheniramine maleate and its metal salt can control significantly the pathologic development of cells in animal body. For instance, chlorpheniramine maleate controls the growth of Ehrlich ascites tumor in mice and Watanabe II ascites tumor in rats. The present invention is based on that finding.

Accordingly, a basic object of the present invention is to embody a composition for controlling pathologic development of cells in animal body. Another object of the invention is to embody a method for controlling pathologic development of cells in animal body. A further object of the invention is to embody a new use of chlorpheniramine maleate and its metal salts. These and other objects will be apparent to those conversant with the art to which the present invention pertains from the above and subsequent descriptions.

In the present invention, there is used as an active ingredient chlorpheniramine maleate or its metal salt.

Examples of the metal salt are alkali metal salts (e.g. sodium salt, potassium salt) and alkaline earth metal salts (e.g. calcium salt, magnesium salt).

The active ingredient may be administered in the form of conventional pharmaceutical preparations. These preparations contain the salt active ingredient in admixture with a pharmaceutical organic or inorganic carrier material suitable for enteral or parenteral application. For the production of these preparations, such substances are concerned as do not react with the active ingredient, as for example water, gelatin, lactose, starch, magnesium stearate, talc, vegetable oils, gum, polyalkylene glycols or other known medicament carriers. The pharmaceutical preparations can take the form, for example, of tablets, dragees, pills, powders, capsules, or are in liquid form as solutions, suspensions or emulsions. They may be sterilized and/or contain auxiliary substances, such as preservatives, stabilizing, wetting or emulsifying agents. The pharmaceutical preparations are formulated by the usual methods.

The content of the active ingredient in the said preparations may vary. It is, of course, necessary that the active ingredient be present in such an amount that a suitable dosage will be ensured. Ordinarily the preparations should not contain less than 0.1% by weight of the active ingredient. The preferred amount of the active ingredient is between about 0.3% by weight and about 10% by weight of the preparations. The dose of the active ingredient may be associated with the condition of disease, the kind and weight of the animal body to which the active ingredient is applied and the like.

Practical embodiments of the present invention are shown in the following examples.

EXAMPLE 1

Chlorpheniramine maleate (3 grams) is dissolved in water to make 1000 ml. The resultant 0.3% aqueous solution is intraperitoneally administered to mice weighing 15 to 17.5 grams and bearing Ehrlich ascites tumor (Type 4 N) at a daily dose of 0.1 to 0.5 milliliter per animal for controlling the ascites tumor.

EXAMPLE 2

Chlorpheniramine maleate (5 grams) is dissolved in water to make 1000 ml. The resultant 0.5% aqueous solution is intraperitoneally administered to rats weighing 130 to 150 grams and bearing Watanabe II ascites tumor at a daily dose of 0.3 to 1.0 milliliter per animal for controlling the ascites tumor.

EXAMPLE 3

|  | Grams |
|---|---|
| (1) Chlorpheniramine maleate | 30 |
| (2) Wheat starch | 641 |
| (3) Methylcellulose | 104 |
| (4) Talc | 180 |
| (5) Magnesium stearate | 35 |

Chlorpheniramine maleate and wheat starch are mixed, kneaded with 5% methylcellulose paste and granulated. The granules are mixed with talc and magnesium stearate and tabletted in a conventional manner to make 2,000 tablets. Each tablet weighing 495 milligrams contains 15 milligrams of chlorpheniramine maleate.

EXAMPLE 4

|  | Grams |
|---|---|
| (1) Chlorpheniramine maleate | 20 |
| (2) Mannitol | 2280 |
| (3) Wheat starch | 400 |
| (4) Magnesium stearate | 100 |

Chlorpheniramine maleate, mannitol and wheat starch are thoroughly mixed and granulated. For tableting, magnesium stearate is added, mixed with the granules and the mixture tabletted in a conventional manner to make 5,000 tablets. Each tablet weighing 560 milligrams contains 4 milligrams of chlorpheniramine maleate.

EXAMPLE 5

|  | Grams |
|---|---|
| (1) Chlorpheniramine maleate | 5 |
| (2) Wheat starch | 700 |
| (3) Lactose | 295 |

Chlorpheniramine maleate, wheat starch and lactose are thoroughly mixed and sieved to make 0.5% chlorpheniramine maleate.

What is claimed is:

1. A method for controlling Ehrlich ascites tumor in mice which comprises the intraperitoneal administration of a 0.3% aqueous solution of chlorpheniramine maleate to a mouse afflicted with said tumor at a daily dose of 0.1 to 0.5 milliliter.

References Cited

Suguira, Cancer Research, vol. 25, No. 3, Part 8, April 1965, pp. 494–496 and 501–512.

Spencer, Cancer Research, vol. 25, No. 4, Part 2, May 1965, pp. 999, 1002–1004, 1006–1011 and 1015–1019.

ALBERT T. MEYERS, Primary Examiner

E. GOLDBERG, Assistant Examiner